Sept. 4, 1956 P. BAKKER 2,761,908

TELEPHONE SYSTEM

Filed Aug. 19, 1952 3 Sheets-Sheet 1

PANEL CIRCUIT

INVENTOR.
PIER BAKKER

BY Mc Watters Owen.

ATTY.

Sept. 4, 1956 P. BAKKER 2,761,908

TELEPHONE SYSTEM

Filed Aug. 19, 1952 3 Sheets-Sheet 2

INVENTOR.
PIER BAKKER

BY Wm. Walter Owen

ATTY.

P.A.X. SWITCHING EQUIPMENT

INVENTOR.
PIER BAKKER
BY Wm. Walter Owen
ATTY.

United States Patent Office 2,761,908

Patented Sept. 4, 1956

2,761,908

TELEPHONE SYSTEM

Pier Bakker, Chicago, Ill., assignor to Automatic Electric Laboratories, Inc., Chicago, Ill., a corporation of Delaware Application August 19, 1952, Serial No. 305,240

7 Claims. (Cl. 179—27)

This invention relates to telephone systems and more particularly to the handling of information calls in such systems. More specifically the invention is concerned with the provision of telephone facilities for an information center.

Such information centers frequently include a plurality of telephone or attendant's stations in a number of different locations. For example, taking the case of a large power supervisory board having a considerable number of instruments, meters, etc. which are distributed over a plurality of board sections, information derived from the readings of certain instruments may be available at one or more certain sections of the board and data furnished by the readings of other instruments may be obtainable at another or other sections of the board.

Another example for an information center of the above-mentioned kind is presented by the record files department of a large business organization having a number of file desks. Frequently such central record files are organized in such a way that certain types of records are in convenient reach of only a certain one or certain ones of these desks while other types of records are kept at another or other desks.

At information centers of this general type it is accordingly desirable to have telephone inquiries regarding one class of information come up at a telephone station or stations at one particular location or group of locations and have telephone inquiries regarding information of another class come up at a telephone station or stations at another location or group of locations. It will readily be seen that particularly where the number of these classes is considerable, a given station may belong to more than one information group and should, therefore, be connected to a plurality of information lines or trunks having different calling numbers in the local switchboard. Even where there is only one telephone station it may be desirable to provide several information lines having separate directory numbers and provide separate signalling devices at the telephone station so that actuation of a given signalling device immediately advises the attendant of the class and consequently the urgency of the inquiry.

A primary object of the invention accordingly resides in the provision of means for expediting the telephone services at telephone stations serving a plurality of information lines.

It is another object of the invention to provide simple and efficient means for enabling the attendant at such a station to place one of these lines in a holding condition while he is attending to a call involving another line connected to that station.

Figure 1:
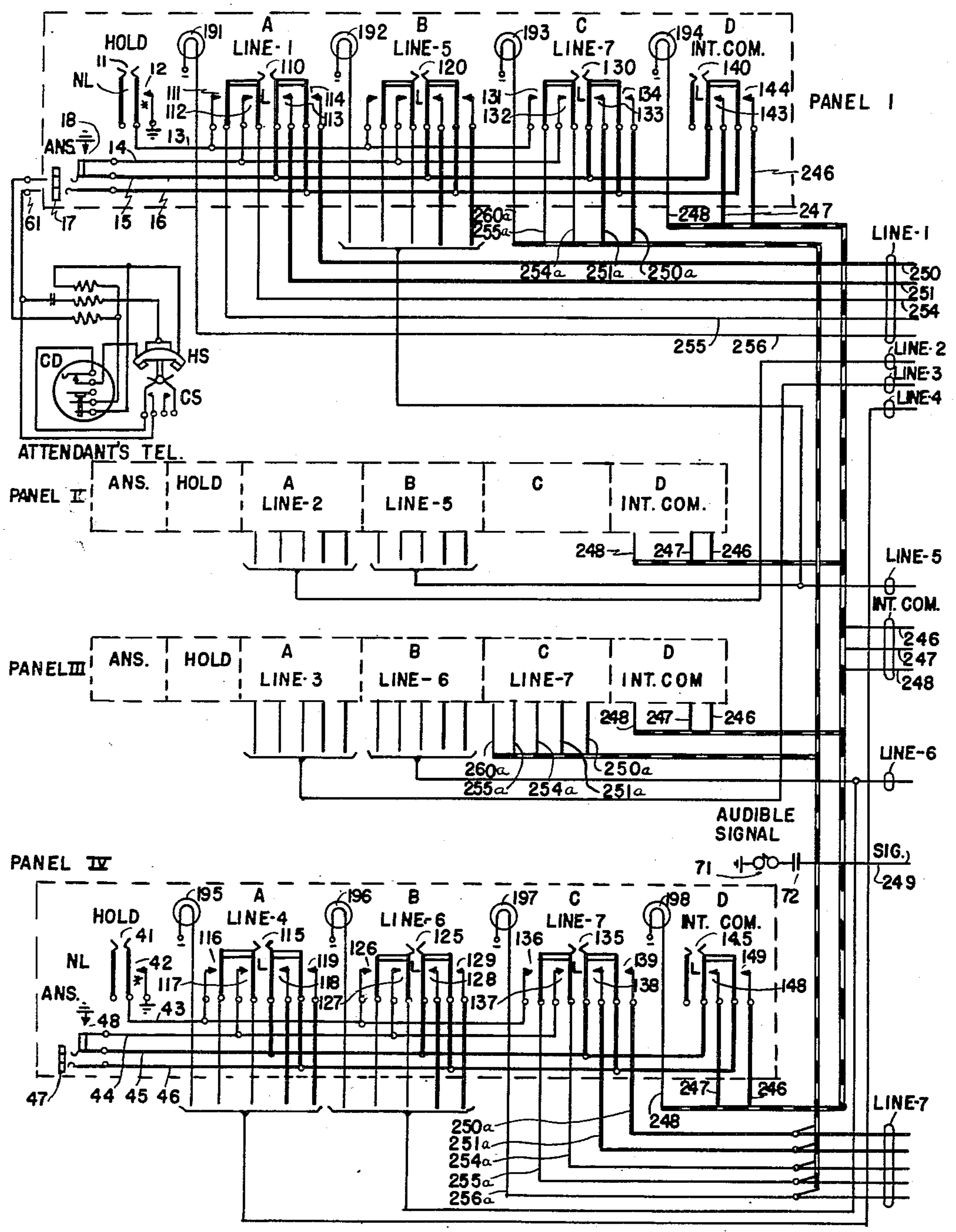
Figure 2:
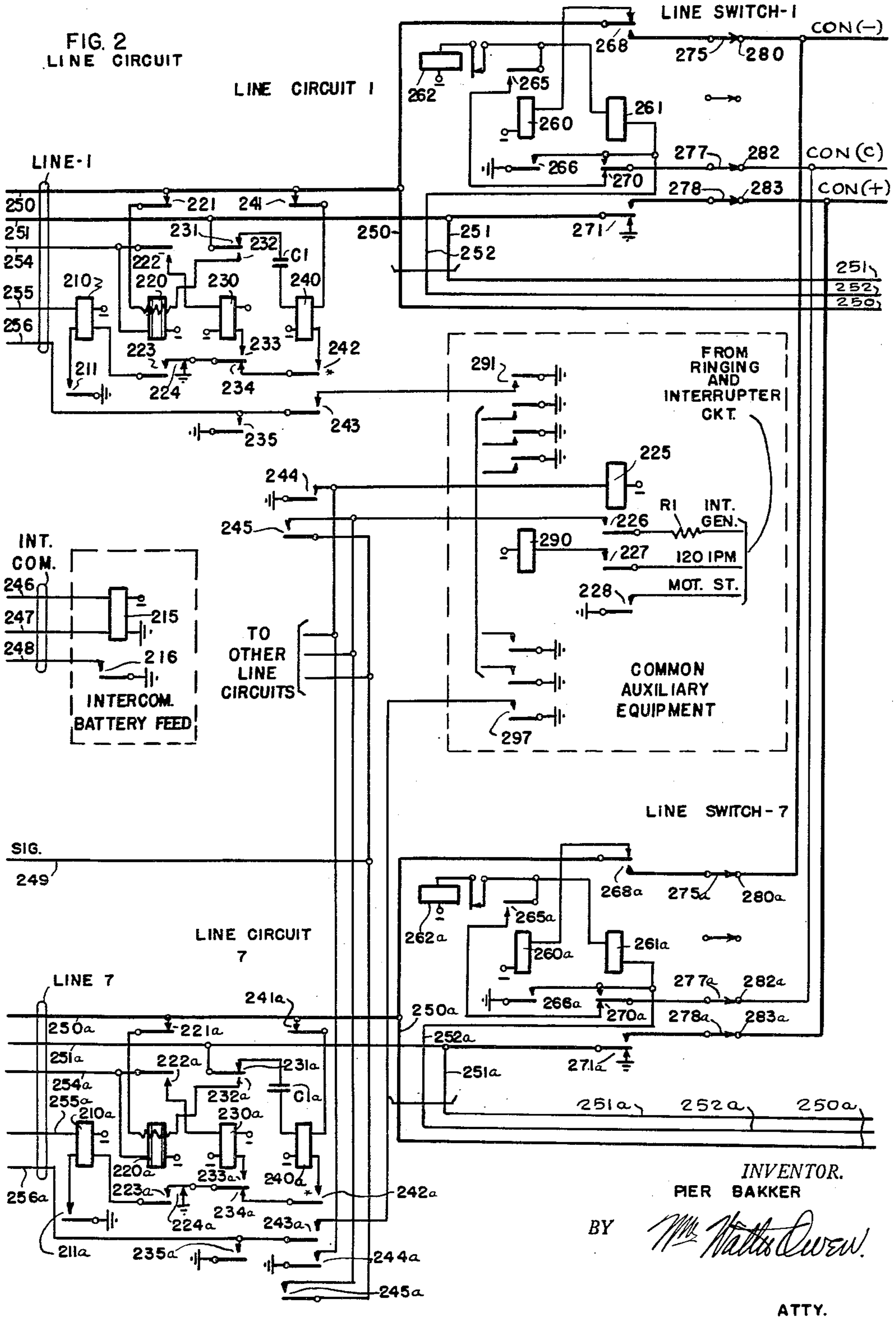
Figure 3:
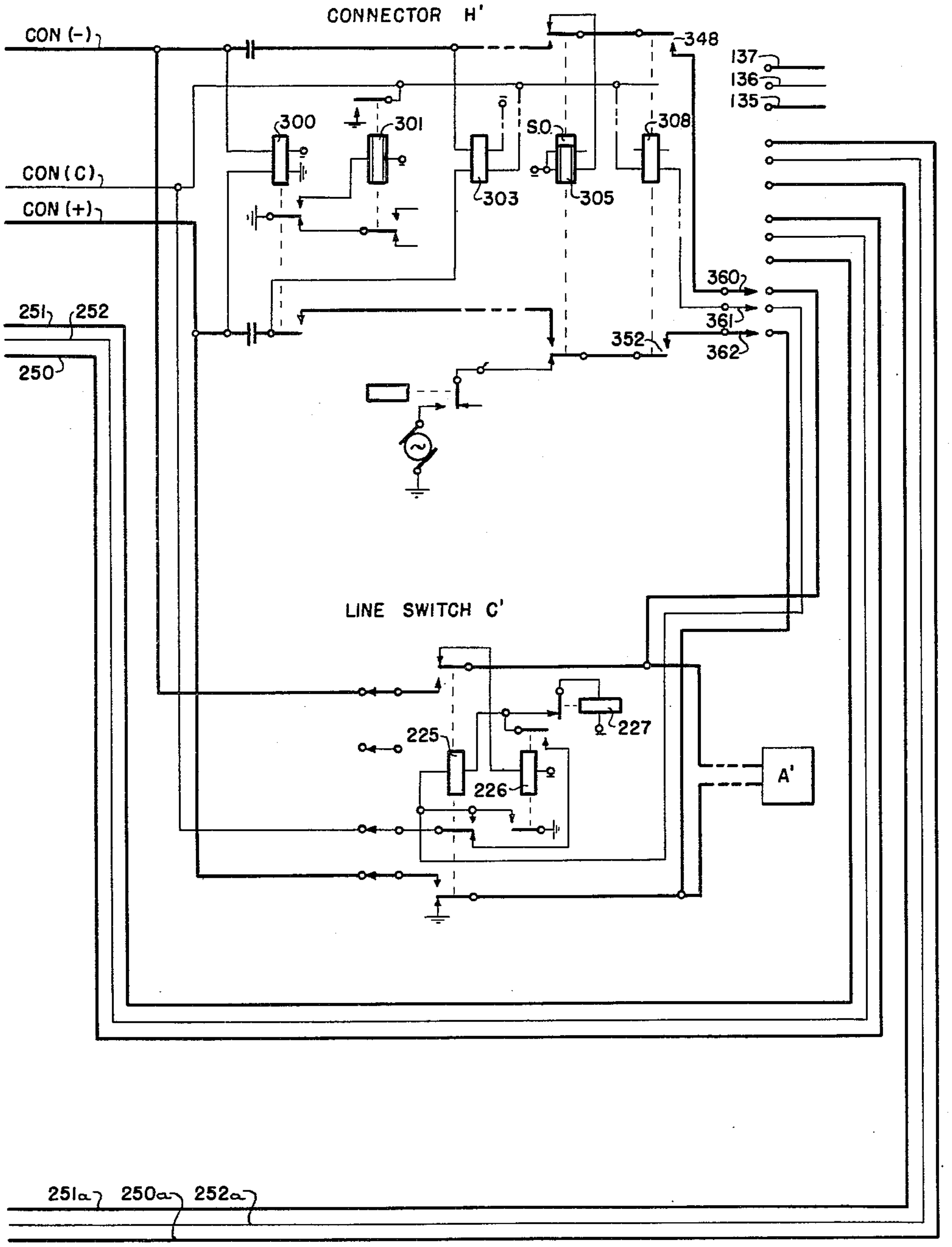

The invention, both as to its organization and method of operation, together with other objects and features thereof, will best be understood by reference to the following specification taken in connection with the accompanying drawings. In these drawings:

Fig. 1 shows four telephone stations in the form of key panels to which a total of seven information lines are connected in various combinations; Fig. 2 shows the line circuits and the line switches associated with these information lines in the private automatic exchange, together with related common equipment; and Fig. 3 shows a substation A' connected to this exchange together with its associated line circuit and also shows portions of a local connector H' which forms part of the switching equipment of the private automatic exchange. Fig. 2 should be placed to the right of Fig. 1 and Fig. 3 to the right of Fig. 2.

A brief description will first be given of the apparatus employed in the illustrated embodiment of the invention. The information center assumed herein for purposes of illustration has four telephone stations and a total of seven information lines, each accessible over the connector banks of the private automatic exchange of the plant or business organization of which that center forms a part. Referring first to Fig. 1 each of the four telephone stations I, II, III and IV is in the form of a key panel having four line keys of the mechanically interlocking plunger-type, designated A, B, C and D, respectively; and a non-locking lever-type hold key which upon actuation mechanically releases the plunger key last depressed.

The plunger of each of the line keys has a locking member co-operating with a spring controlled locking plate or bar mounted for sliding movement lengthwise of the key set. When any of the plungers is depressed a cam surface on the locking member causes the locking bar to be displaced longitudinally against the action of that spring, thereby releasing any previously actuated plunger. When pressure is released from the first mentioned plunger and the plunger begins its upward stroke, the locking member thereon is caught by the locking bar and the plunger thereby locked in actuated position. The non-locking lever-type hold key has a cam member or roller cooperating with the locking bar in such a way that the bar is longitudinally displaced upon actuation of the lever key to release any plunger key that had previously been depressed.

A key set of this general type is described, for example, in U. S. Patent 1,173,095 to A. J. Carter to which reference is made for details of construction. In the Carter patent the keyset is associated with an operator's cord circuit for purposes of party line ringing, the plunger keys serving as frequency selecting keys and the lever key having in addition to its non-locking position which is used for straight line ringing, a locking position which is the listening position of the key. The contacts controlled by the plunger keys are so adjusted that they are actuated only when the plunger is fully depressed and are no longer actuated when the plunger has moved to its locking or intermediate position.

The keyset shown in Fig. 1 of the instant application may have the same construction as the keyset shown in the Carter patent in all mechanical details except that the locking position of the lever key is not required in the instant case and that the contacts controlled by the plungers are adjusted to remain in their actuated condition when the plunger moves to its locking position, that is return to their normal condition only when the plunger is freed from its locking position by the action of the locking plate. As indicated by the symbol $x$ in Fig. 1 the make contact actuated by the lever-type hold key is adjusted to close near the beginning of the lever stroke. This insures that the circuit controlled by this contact is made effective before the last-depressed line plunger is mechanically released due to the displacement of the locking plate by the cam member of the lever key.

Each of the four key panels shown in Fig. 1 is further equipped with four signal lamps each associated with one of the line keys; and with a talking circuit common to all four line keys and terminating in an answering jack into which the plug of the attendant's telephone shown in Fig. 1 may be inserted.

The seven information lines are connected to the four key panels according to the following pattern: lines 1–4 are each individually connected to one of the four panels in the same order, line 5 has an appearance in both panels I and II, line 6 in both panels III and IV and line 7 in panels I, III and IV. More specifically lines 1, 2, 3 and 4 are connected to keys A in panels I, II, III and IV, respectively, line 5 is connected to keys B in panels I and II, line 6 to keys B in panels III and IV and line 7 to keys C in panels I, III and IV. In addition to the seven information lines an intercom line is provided and this line is connected to keys D of all four panels.

It has been assumed that the layout of the information center is such that one audible signal common to all four locations will suffice, but it should be understood that more than one audible signal may be provided. Furthermore while only one attendant's telephone has been shown a plurality of these telephones and associated plugs may be provided dependent on the maximum number of attendants that have to be on duty simultaneously at any given time. The situation may, for example, be such that ordinarily the services of only one attendant are sufficient. In this case the attendant moves with his telephone from one panel to another when a call comes up on a panel to which he does not happen to be connected at the time. On the other hand there may be times of peak traffic when two or more attendants have to be on duty simultaneously even though all four panels may be situated in the same room; thus, one attendant may be in charge primarily of panels I and II and another attendant of panels III and IV. In such cases a separate telephone and associated plug would be provided for each attendant and transfer of a call from one to another attendant would then be possible by means of the intercom circuit as will be described in greater detail hereinafter.

As shown in Fig. 1, a handset HS is used as the telephone instrument; instead, receiver and transmitter could be mounted separately, for instance the receiver as part of a headset and the transmitter as part of a breast plate. As will further be noted from Fig. 1, the attendant's telephone circuit includes a calling device or dial CD which enables the attendant to place outgoing calls over any of the information lines.

Referring now to Fig. 2 there is shown two of the line circuits associated with the seven information lines mentioned above, the line circuit associated with line 1 being shown in the top part of the figure and that associated with line 7 in the bottom part of the figure. Referring for instance to line circuit 1, this circuit includes the magnet 262 of an associated rotary line switch of conventional design having line wipers 275, 278 and a control wiper 277; a line relay 260; a cut-off relay 261; and a group of four relays 210, 220, 230 and 240 which are provided on information lines only and are used for signalling, answering and holding purposes on calls to and from these lines.

The private automatic exchange of which these line circuits form a part is only schematically shown in Fig. 3, but in this connection reference is made to Patent 1,620,113 to C. E. Lomax. This patent in its Figures 4 and 3 shows the automatic equipment and the cord circuit, respectively, of a private automatic exchange which is connected to a main exchange by way of a trunk line 428, 429, the apparatus in the main exchange being shown in Figures 1 and 2 of the patent. The line switch and associated line and cut-off relays shown in detail in Fig. 1 of the present application are of the same circuit design as the line switch C and associated line and cutoff relays disclosed in Fig. 4 of the Lomax patent and substation A′, lineswitch C′ and connector H′ shown in Fig. 3 hereof are of the same circuit design as substation A′, lineswitch C′ and connector H′, respectively, of Fig. 4 of the Lomax patent; for convenience in reference the same reference numerals have been used to designate corresponding parts. The private automatic exchange disclosed in Patent 1,620,113 and indicated schematically in Fig. 3 of the present application in a connector exchange but it should be understood that the present invention may likewise be practiced in connection with larger exchanges using a selector stage between the line switches and connectors for increased capacity.

The other line circuit shown in Fig. 2 of the instant application and associated with information line 7 is identical with that of line circuit 1 and uses and same reference characters except that the suffix *a* has been added to each reference numeral. Fig. 2 in addition shows two relays used in common with the line circuits, one of these relays, 225, serving as a start relay and the other relay, 290, serving to repeat impulses received at the rate of 120 impulses per minute from common interrupter equipment not shown. Fig. 2 also shows a line relay, 215, which is used to provide battery feed on intercom calls.

Having described the apparatus used in the present embodiment of the invention in general terms a detailed description will now be given of the manner in which this apparatus functions in extending calls to and from the telephone stations shown in Figure 1.

Let us assume first that a subscriber of the private automatic exchange of the plant or business establishment considered herein seeks information of a certain character which the telephone directory advises him can be obtained by dialing the calling number of information line 1. The aforementioned calling subscriber, e. g. subscriber A′, Fig. 3, upon lifting his receiver will accordingly dial this number to set by way of his line switch C′ the wipers of the local connector switch such as connector H′ into engagement with the bank contacts with which information line 1 is connected. Assuming that this line is idle switching relay 308 of connector H′ will operate by way of test wiper 361 and test conductor 252 in series with the windings of line and cut-off relay 261 and of line switch magnet 262, as partially shown in Figs. 2 and 3 of the present application. Both relays 308 and 261 operate in this circuit, the first mentioned relay locking to local ground in a manner not particularly illustrated in Fig. 3 and at its contacts 348, 352 causing ringing current to be projected over the line wipers 360, 362 of the connector, and the last mentioned relay acting to disconnect battery and ground from the called information line at contacts 268 and 271, respectively.

Ringing current thus projected over the wipers and bank contacts of connector H′ causes the operation of ring-up relay 240, Fig. 2, over a circuit path including line conductor 250, contact 241, upper winding of relay 240, condenser C1, contact 231 and line conductor 251. Upon operating ring-up relay 240 at its preliminary contact 242 locks to ground over a circuit extending through contacts 224, 234, 242, and the lower winding of relay 240 to battery; at 241 the relay disconnects its upper winding from line conductor 250; at 244 relay 240 causes the operation of common start relay 225 over an obvious circuit; at 245 the relay prepares the circuit for the audible signal and at 243 for the visual signal. When the common start relay 225 operates it grounds the motor start conductor at contact 228 to start the common ringing interrupter equipment not shown; switches the interrupted generator conductor through at contact 226; and at contact 227 closes the winding of pulse repeat relay 290 to the 120 I. P. M. conductor. Due to the closure of contact 226, interrupted generator is applied to the audible signal 71, Fig. 1, by way of resistor R1, contacts 226 and 245, signal conductor 249, condenser 72, Fig. 1, audible signal 71, ground. Relay 290 is periodically operated and released by virtue of ground pulses received over the 120 I. P. M. conductor at a rate of 120 operating cycles per minute and accordingly causes the combination calling and busy lamp 191 in position A of panel I, Fig. 1, to be intermittently lighted at this rate by way of the following circuit: ground, contacts 291, 243, conductor 256, lamp 191, Fig. 1, battery. This flashing of lamp 191 advises the attendant at the information center that a call has come in over information line 1 and is waiting to be answered.

The attendant upon hearing the audible signal and noticing the flashing of lamp 191 will accordingly insert plug 61 of his telephone circuit into answering jack 17 associated with panel I and will also depress the key marked "Line 1" in position A of this panel to answer the call. When the attendant releases the pressure on this key the key is automatically locked in operated position as described above. At contacts 114, 113 of the line 1 key the loop circuit over line 1 is now completed by way of line conductor 250, contact 114, Fig. 1, common talking conductor 16 of panel I, plug 61 and the closed contacts of cradle switch CS of the attendant's telephone circuit, common talking conductor 15 of panel I, contact 113, line conductor 251. As a result ring cut-off relay 305 in connector H' operates to switch the called line through to battery feed relay 303 of this connector. The transmitter in the attendant's telephone circuit is accordingly supplied with talking battery over the windings of this relay.

Furthermore the following circuit for relay 220, Fig. 2, is closed at contact 112 of the line-1 key: ground, jack contact 18, conductor 14, contact 112, conductor 254, lower winding of relay 220, Fig. 2, battery. Relay 220 upon operating at its contact 221, opens a point in a holding circuit extending over the upper resistance winding of relay 220; at contact 222, relay 220 extends ground on conductor 254 to the upper winding of relay 230 to operate this last mentioned relay; at contact 224, relay 220 opens the holding circuit of relay 240 and at contact 223 prepares a holding circuit for relay 230 extending over the lower winding of relay 210. Relay 240 in releasing at its contact 244 causes start relay 225 to restore, at its contact 245 disconnects the audible signal and at its contact 243 disconnects flashing ground from lamp conductor 256. Relay 230 in operating at its contact 235 closes direct ground to this conductor to steadily light lamp 191, Fig. 1, thereby indicating the busy condition of line 1. Relay 230 at its contact 231 also opens a point in the circuit extending through the upper winding of relay 240; at its contact 232 closes a point in the aforementioned holding circuit extending over the upper resistance winding of relay 220; and at contact 233 closes another point in the above-mentioned holding circuit extending over the lower winding of relay 230. Start relay 225 upon releasing at its contact 228 removes ground from the motor start conductor and at 227 disconnects the pulse repeat relay 290 from the 120 I. P. M. conductor.

The calling subscriber A' is now connected by way of his own line switch C', connector H', line conductors 250, 251, contacts 114, 113 of the line-1 key, common talking conductors 16, 15, answering jack 17 of panel I and plug 61 with the attendant's telephone at the information center and can therefore converse with this attendant to obtain the required information from him.

Assuming for purposes of illustration that the attendant will need some time to gather the necessary data he may advise the calling subscriber to replace his receiver, whereby the automatic equipment in the private automatic exchange is released. The attendant also disconnects by replacing his handset HS on the cradle switch CS so that the unnecessary seizure of a connector by line switch 1, Fig. 2, subsequent to the release of the automatic equipment is avoided at this time. It will be assumed, however, that the attendant leaves plug 61 in answering jack 17 so that ground at jack contact 18 is maintained on conductor 254 and relays 220 and 230 in line circuit 1, Fig. 2, accordingly remain operated over contact 112 of the actuated line-1 key.

After the attendant has obtained the necessary data he will call subscriber A' back by lifting his handset HS from the cradle, thereby causing line switch 1, Fig. 2, to search for an idle connector in a well known manner and will then dial the directory number of subscriber A' by actuating his calling device C11. Consequently, the wipers of a connector such as H' are set on the bank contacts leading to the line circuit, C', associated with this subscriber's line and ringing current is projected over this line. Subscriber A' accordingly answers the call by lifting his receiver and may now again enter into conversation with the attendant at the information center.

Let it be assumed now that while the attendant is transmitting the requested information to subscriber A' a call to the information center comes in over information line 7 so that relay 240a of line circuit 7, Fig. 2, operates. Relay 240a in turn causes common relays 225, 290 to be operated and the lamps associated with information line 7 in position D of panels I, III and IV to be flashed as an indication that a call is waiting to be answered on this line. It will further be assumed that although another attendant, more specifically in charge of panels III and IV, is on duty at the information center, this attendant is preoccupied with other matters such as the handling of another call, so that it becomes necessary for the attendant at panel I, to answer the call incoming over information line 7. However, assuming that the inquiry made by subscriber A' over information line 1 is of an urgent nature and the attendant at panel I accordingly anxious to pass the corresponding information on to subscriber A' as quickly as possible, this attendant before picking up line 7 will first place information line 1 on holding by momentarily depressing key 11 on panel I. This will make it unnecessary for this attendant to again set up the connection to subscriber A' after dealing with the call on information line 7. Moreover an additional delay due to the line of subscriber A' becoming busy in the meantime in another call to this line, is obviated in this manner. It may be mentioned at this point that another situation in which the attendant may wish to hold a line, such as information line 1, arises if the call over this line happens to be a trunk call extending over trunk 428, 429 to or from a distant subscriber such as A2 in the main office, Figs. 1 and 2 of Patent 1,620,113.

As mentioned above, actuation of hold key 11 will result in the mechanical release of the previously actuated line-1 key but before the plunger of this last mentioned key is thus released the following circuit for relay 210 is completed: ground, make contact 12 marked "x" of non-locking hold key 11, conductor 13, contact 111 of the line 1 key, conductor 255, upper winding of relay 210, battery. Upon operating relay 210 at its contact 211 establishes a temporary locking circuit for itself and relay 230 by way of the following circuit: ground, lower winding of relay 210, contacts 223 and 233, lower winding of relay 230, battery. Therefore, when line key 1 releases, relay 230 will stay operated in spite of the disconnection of ground from its upper winding at contact 112 of the line 1-key.

However, with ground disconnected from conductor 254, at contact 112, relay 220 will release after a short interval and at contacts 223, 224 transfer the locking circuit of relay 230 from ground through the lower winding of relay 210 to direct ground at contact 224. Relay 220 in releasing at contact 221 also completes a holding bridge over line conductors 250, 251, of information line 1, this bridge extending over contact 221, the upper resistance winding of relay 220 and contact 232 in series. As a result the calling bridge relay such as relay 300 in connector H', Fig. 3, will remain operated and the automatic equipment used in extending the connection to subscriber A' accordingly kept from releasing. It will be clear that if hold key 11 had not been momentarily depressed, both relays 230 and 220 would have been restored upon the mechanical release of line-1 key and the line circuit accordingly returned to normal without a holding bridge being placed across the line to maintain the connection.

The attendant at panel I can now pick up information line 7 by depressing the line-7 key at this panel whereby relays **220*a* and 230*a* are operated by way of the following circuit: ground, jack contact 18, conductor 44, contact 137, conductor 254*a*, lower winding of relay 220*a*, battery, this circuit being extended at contact 222*a* to the upper winding of relay 230*a* as soon as relay 220*a* operates. Accordingly relay 240*a* is released due to its locking circuit being opened at 224*a* and 234*a*, and the common relay equipment thereby restored to normal; and at contact 235*a* of relay 230*a* direct ground is closed to conductor 256*a* to steadily light the lamps such as 193, 197 associated with information line 7 over an obvious circuit, thereby indicating the busy condition of this line at all panels, viz I, III and IV, to which this line is connected. At contacts 133, 134 of the line-7 key the attendant's telephone connected with panel I is switched through by way of talking conductors 250*a* and 251*a* to the subscriber who initiated the call over information line 7** and this subscriber can therefore converse with the last-mentioned attendant to submit his inquiry.

Let us assume that the attendant at panel I who, as mentioned above, is anxious to pass the requested information on to subscriber A′ at the earliest possible moment wishes to get in contact with the other attendant at the information center to ascertain whether this attendant is now in a position to deal with the inquiry received over information line 7. The attendant at panel I accordingly again actuates non-locking hold key 11, thereby causing the operation of relay **210*a* over a circuit extending from ground through jack contact 12, conductor 13, contact 131, conductor 255*a* and the upper winding of relay 210*a* to battery. Upon release of the line-7 key due to the actuation of the hold key, and the consequent restoration of slow release relay 220*a* a holding bridge is, therefore, placed across talking conductors 250*a* and 251*a* of line 7 by way of make contact 232*a* of relay 230*a* in the same manner as described above in connection with line 1**.

The attendant at panel I next actuates intercom key 140 at this panel so that intercom battery feed relay 215, Fig. 2, operates in a loop circuit extending from the attendant's telephone circuit, through closed contacts of cradle switch CS, plug 61, answering jack 17, contacts 143, 144 of intercom key 140, contacts 246, 247, upper and lower windings of relay 215 to battery and ground, respectively. Relay 215 in operating at its contact 216 closes ground to conductor 248 so that the lamps, such as 194, 198, associated with the intercom circuit at all four panels are steadily lighted as an indication that an attendant is connected to this circuit. Upon noticing the intercom lamp at either panel III or panel IV the attendant specifically in charge of these two panels picks the intercom line up by actuating the intercom key, say key 145 at panel IV. At contacts 148, 149, the telephone circuit of this attendant which is not shown in Fig. 1 is therefore connected to the intercom talking conductors 246, 247 and the two attendants can now converse with each other over these conductors, battery feed to both transmitters being supplied through the windings of relay 215.

Assuming that the attendant in charge of panels III and IV is now able to attend to the inquiry that has come in over information line 7 he will pick up this line by actuating the line-7 key, 135, at panel IV whereby intercom key 145 is mechanically released. It will be recalled that relay **230*a* of line circuit 7 is already operated holding a bridge across talking conductors 250*a*, 251*a*. With line key 135 depressed ground is now connected to conductor 254*a* by way of jack contact 48, conductor 44 and contact 137, and relay 220*a* accordingly operates, in turn extending this ground to the upper winding of relay 230*a* at contact 222*a* to insure the holding of the last mentioned relay. At contact 221*a* relay 220*a* opens the aforementioned holding bridge and at contact 223*a* opens the locking circuit to the lower winding of relay 230*a*. At contacts 138, 139 to the line-7 key at panel IV the attendant at this panel is connected through to line conductors 250*a*, 251*a* of information line 7** and may now enter into conversation with the subscriber who originated the call over this line to further deal with his inquiry.

Reverting again to panel I, the attendant at this panel can now again connect himself to line 1 which is still in holding condition by depressing line-1 key 110. Accordingly relay 220 operates in addition to the already operated relay 230 and the holding bridge across line 1 is disconnected at contact 221. The attendant at that telephone is now again connected to line 1 by way of contacts 113, 114 of the line 1 key and can now pass the necessary information on to the subscriber at substation A′. Also upon actuation of the line 1 key intercom key 140 is mechanically released and relay 215 accordingly restores, extinguishing the intercom lamps by the opening of its contact 216.

After the attendant at panel I has completed his conversation with subscriber A′ he releases the automatic equipment by replacing his handset on the cradle, thereby opening contact CS. When the attendant subsequently withdraws plug 61 from jack 17 relays 220 and 230 restore due to the opening of jack contact 18 and line circuit 1 is thus restored to its normal condition. Similarly line circuit 7 returns to its normal condition when the other attendant upon completion of the conversation held over information line 7 withdraws the plug of his telephone circuit from jack 47.

While one particular embodiment of this invention has been described, it is to be understood that numerous modifications in the details of arrangement may be resorted to without departing from the true spirit and scope of the invention as defined in the appended claims. Thus, while relays 210, 220, 230 and 240 and similarly relays **210*a*, 220*a*, 230*a* and 240*a* are circuitwise a part of the line circuit, these relays may if desired be mounted separately from the line and cut-off relays, for example, in a unit also housing common relays 225 and 290 and intercom line relay 215**.

What is claimed is:

1. In a telephone system, a private automatic exchange having a number of subscribers' lines connected thereto, a telephone station connected to a plurality of said lines, a plurality of signaling devices at said station, one for each line to which said station is connected, a talking circuit and a non-locking hold device at said station both common to the lines connected to said station, means at said station for selectively switching said talking circuit to any one of the last-mentioned lines, a connector in said exchange directively set by impulses received from a calling party to cause the signaling device associated with a desired one of said lines to be actuated, and a line circuit associated with each of said lines, said line circuit including relay means operated responsive to the momentary actuation of said hold device for placing said line in a holding condition, the operating circuit of the last-mentioned relay means extending through contacts of said selective switching means.

2. In a telephone system, an exchange having a number of subscribers' lines connected thereto, a plurality of telephone stations each connected to a plurality of said lines, a plurality of calling lamps at each station, one for each line to which said station is connected, a talking circuit and a non-locking hold device at said station both common to the lines connected to said station, means at said station for selectively switching said talking circuit to any one of the last mentioned lines, connecting means in said exchange directively set under the control of a calling party to connect ringing current to a desired one of said lines and a line circuit individually associated with each of said lines; said line circuit including line and cut-off relay means, means responsive to ringing current received from the connecting means in said exchange for lighting the associated calling lamp at the station or stations to which said line is connected, and relay means operated responsive to the momentary actuation of said hold device for placing said line in a holding condition, the operating circuit of the last-mentioned relay means extending through contacts of said selective switching means.

3. In a telephone system, an exchange having a number of subscribers' lines connected thereto, a plurality of telephone stations each connected to a plurality of said lines, a plurality of calling lamps at each station, one for each line to which said station is connected, a talking circuit common to the lines that are connected to said station, a set of interlocking, contact-actuating plungers at said station for selectively connecting said talking circuit to any one of the last-mentioned lines, a common non-locking lever-type hold key at said station effective upon actuation first to close a circuit extending through contacts of the actuated plunger and then release said plunger, whereby said circuit is opened, connecting means in said exchange directively set under the control of a calling party to transmit ringing current to a desired one of said lines, and a line circuit associated with each of said lines; said line circuit including line and cut-off relay means, means responsive to ringing current received from said connecting means for lighting the associated calling lamp at the station or stations to which said line is connected and relay means responsive to the momentary closure of said circuit for placing said line in a holding condition.

4. In a telephone system, an exchange having a number of subscribers' lines connected thereto, a telephone station connected to a plurality of said lines, a plurality of combination calling and busy lamps at said station, one lamp for each line to which said station is connected, a talking circuit common to the lines that are connected to said station, a set of interlocking contact-actuating plungers at said station for selectively connecting said talking circuit to any one of the last-mentioned lines, a common non-locking hold device at said station effective upon actuation first to close a circuit extending through contacts of the actuated plunger and then release said plunger whereby said circuit is opened, connecting means in said exchange directively set under the control of a calling party to transmit ringing current to a desired one of said lines, and a line circuit associated with each of said lines; said line circuit including line and cut-off relay means, means responsive to ringing current received from said connecting means for intermittently lighting the associated lamp at the station or stations to which said line is connected and relay means responsive to the actuation of the associated plunger to steadily light said lamp and responsive to the momentary closure of said circuit to place said line in a holding condition.

5. In a telephone system, an exchange having a number of information trunks connected thereto, a plurality of key panels each connected to a plurality of said trunks, a plurality of visual indicating means at each panel to separately indicate the condition of the trunks connected thereto, an answering jack at each panel, a telephone instrument, a plug connected to said instrument and insertable into said jack, a set of interlocking contact-actuating plunger-type keys at said panel for selectively connecting said answering jack to any one of the last-mentioned trunks, a non-locking hold key at said panel effective upon actuation first to close a circuit extending through contacts of the actuated plunger and then release said plunger whereby said circuit is opened, connect means in said exchange directively set under the control of a calling party to transmit ringing current to a desired one of said trunks, and a line circuit associated with each of said trunks; said line circuit including line and cut-off relay means, means responsive to ringing current received from said connecting means for actuating in a pre-determined way the associated indicating means at the panel or panels to which said trunk is connected, and relay means responsive to the actuation of the associated plunger at the panel into whose jack said plug is inserted to actuate said indicating means in another way and responsive to the momentary closure of said circuit to place said trunk in a holding condition.

6. A telephone system as claimed in claim 5, characterized in that an intercom circuit having battery feed means is associated with said panels and that said interlocking plungers at each of said panels include a plunger for connecting said jack with said intercom circuit.

7. In a telephone system a private automatic exchange having a number of information trunks connected thereto, a plurality of key and lamp panels each connected to a plurality of said trunks, a plurality of combination calling and busy lamps at each panel, one lamp for each trunk to which said panel is connected, an answering jack at each panel, a telephone instrument, a plug connected to said instrument and insertable into said jack, a set of interlocking contact actuating plunger-type keys at said panel for selectively connecting said answering jack to any one of the last-mentioned trunks, a non-locking hold key at said panel effective upon actuation first to close a circuit extending through contacts of the actuated plunger and then release said plunger whereby said circuit is opened, a connector in said exchange directively set by numerical impulses received from a calling party to transmit ringing current to a desired one of said trunks, and a line circuit associated with each of said trunks; said line circuit including line and cut-off relay means, a relay responsive to ringing current received from said connector for intermittently lighting said lamp, another relay responsive to the actuation of the associated plunger at the panel into whose jack said plug is inserted to steadily light said lamp, and relay means responsive to the momentary closure of said circuit to place a holding bridge across said trunk.

References Cited in the file of this patent

UNITED STATES PATENTS

| | | |
|---|---|---|
| 1,627,929 | Richardson | May 10, 1927 |
| 1,842,585 | Crocker | Jan. 26, 1932 |
| 2,289,895 | Abbott | July 14, 1942 |
| 2,534,850 | Bowne | Dec. 19, 1950 |
| 2,574,943 | Voss | Nov. 13, 1951 |